United States Patent [19]
Graupe

[11] Patent Number: 5,768,392
[45] Date of Patent: Jun. 16, 1998

[54] BLIND ADAPTIVE FILTERING OF UNKNOWN SIGNALS IN UNKNOWN NOISE IN QUASI-CLOSED LOOP SYSTEM

[75] Inventor: Daniel Graupe, Highland Park, Ill.

[73] Assignee: AURA Systems Inc., El Segundo, Calif.

[21] Appl. No.: 632,998

[22] Filed: Apr. 16, 1996

[51] Int. Cl.$^6$ ................................................ H04B 15/00
[52] U.S. Cl. ................................. 381/94.3; 381/94.2
[58] Field of Search ........................... 381/94.2, 94.3; 704/226, 233

[56] References Cited

U.S. PATENT DOCUMENTS

| | | |
|---|---|---|
| 4,811,404 | 3/1989 | Vilmur et al. |
| 4,918,633 | 4/1990 | Sullivan ................................. 364/574 |
| 5,012,519 | 4/1991 | Aldersberg et al. ........................ 381/47 |
| 5,432,859 | 7/1995 | Yang et al. |

OTHER PUBLICATIONS

Mallat, "A Theory for Multiresolution Signal Decomposition: The Wavelet Representation", *IEEE Transactions On Pattern Analysis and Machine Intelligence*, vol. II, No. 7, Jul., 1989.

Graupe, et al., "Self Adaptive Filtering of Noise from Speech: A Hearing Aid Application".

Weerackody et al., "Variable Step-Size Blind Adaptive Equalization Algorithms".

Graupe et al., "An Adaptive-Control-Based Noise Cancellation Approach".

"An Output-Whitening Approach to Adaptive Active Noise Cancellation", *IEEE Transactions On Circuits and Systems*, vol. 38, No. 11, Nov., 1991.

D. Graupe, "Blind Adaptive Filtering of Unknown Speech From Unknown Noise In A Single Receiver Situation".

*Primary Examiner*—Forester W. Isen
*Attorney, Agent, or Firm*—Sitrick and Sitrick

[57] ABSTRACT

A method and system for blind adaptive filtering an input signal having noise and information signal parameters that are separated by an identifier. An open loop filter stage generates an intermediate filtered signal from the noise parameters and the input signal parameters. A cost function generator generates a first cost function signal and an inverse first cost function signal from the open loop filter parameters. A residual signal is generated from the difference between the input signal and the intermediate filtered signal. Another cost function generator, coupled to the input signal and the residual signal generator, generates a second cost function signal and an inverse second cost function that maximize a stationarity feature of the residual signal. A combiner generates a combined cost function from the inverse first and second cost functions. A quasi-closed loop filter generates the filtered output signal from the intermediate filtered signal.

21 Claims, 13 Drawing Sheets

Open Loop Filter - Time Domain (Series) Form

Closed Loop Section

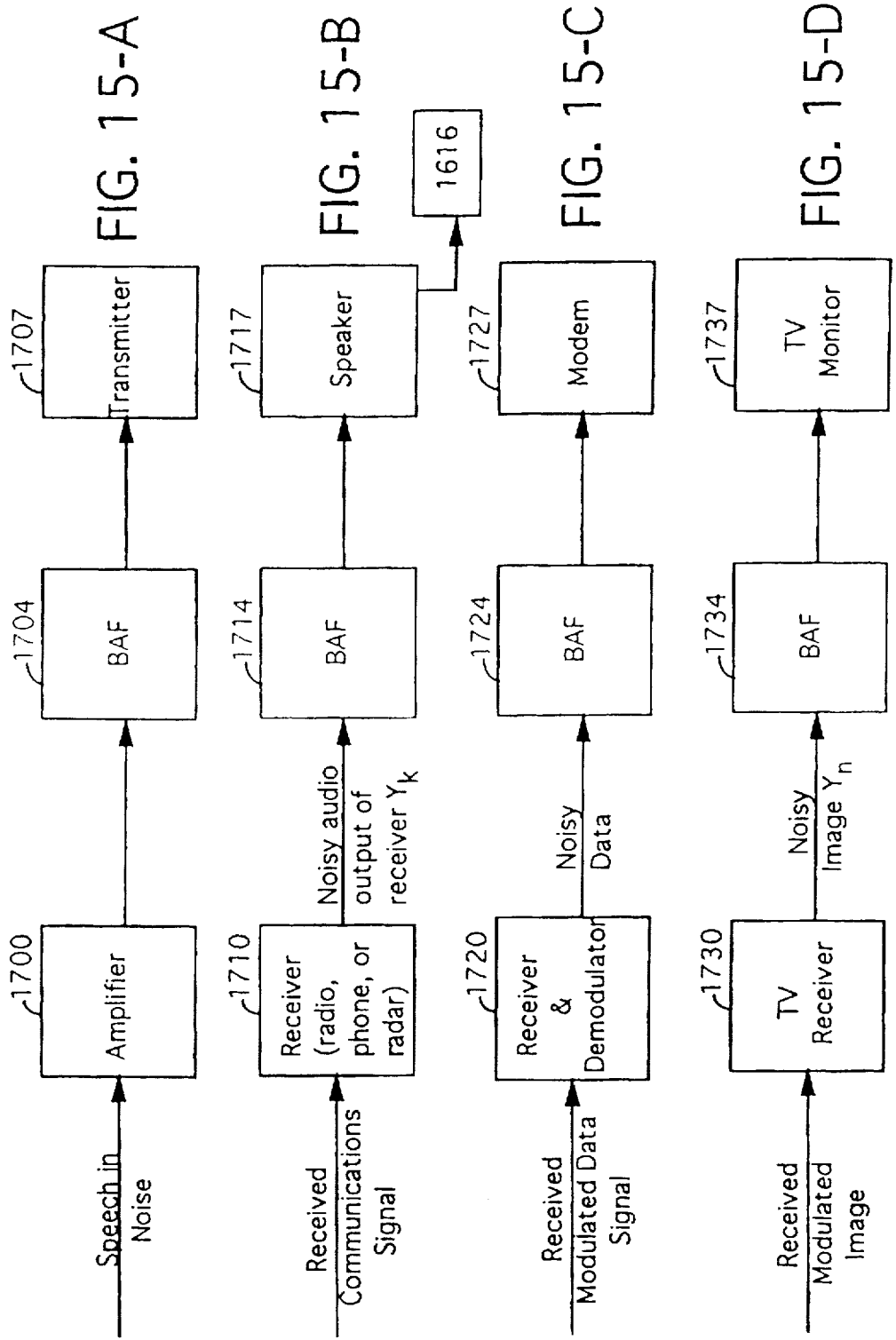

BLIND ADAPTIVE FILTERING OF UNKNOWN SIGNALS IN UNKNOWN NOISE IN QUASI-CLOSED LOOP SYSTEM

BACKGROUND OF THE INVENTION

I. Field of the Invention

The present invention relates generally to filtering of noise. More particularly, the present invention relates to closed loop filtering an inaccessible information signal that is imbedded in unknown noise without prior knowledge of the noise or the information signal or of their parameters including their frequency spectrum parameters.

II. Description of the Related Art

Prior attempts to solve the problem of noise reduction, without prior information on noise or on information signal parameters and with no access to either, have not achieved satisfactory results in high noise levels say of −10 dB Signal to Noise Ratios (SNR) or at more negative ratios. With blind adaptive filtering (BAF) namely, adaptive filtering without prior parameter information on the noise and on the information signal or direct access to these, there is a limit to noise reduction. Because BAF processing constitutes a priori processing forward in time, it is a predictive process. There is a limit, however, to what a predictor can do. See U.S. Pat. No. 5,097,510 (by the present inventor) for teachings and references on Blind Adaptive Filtering.

The predictor error limit would be achieved in theory, if the BAF were to work perfectly correct, without any mistakes in its estimating of the parameters of signal and of noise. In non-real-time image processing, the processing could work both forward and backward in time, in an iterative way. Aposteriori methods could be used to clean up the image beyond the predictor error's limit, taking as much time as was needed.

In on-line signal processing, one does not have access to any time interval into the future because the results of the filtering must be ready in real time or very close to real time of the present time at any time instance. A very short delay may be allowable but this does not permit iterating several times backwards and forwards in time as is necessitated in the cases where the input noise is unknown. In speech communications, this is not practical because a processing delay of more than say 30 milliseconds into the future will result in an echo or in interrupted conversation.

The concept of blind adaptive filtering (BAF) is as follows. Let:

(1) $y_k = s_k + n_k; k=0, 1, 2, \ldots$ where $y_k$ is the incoming accessible noisy input signal, in discrete time k. $s_k$ is the information signal and $n_k$ is noise that is uncorrelated with $s_k$ and where the retrieval of an adequate estimate $\hat{s}_k$ of $s_k$ is the goal of the filtering. Since only $\{y_k\}$ is accessible (available), we first identify a time series model in time or frequency domain for $Y_k$. We shall consider a linear autoregressive (AR) model (see Graupe, *Time Series Analysis, Identification, and Adaptive Filtering*, Chap. 4 (1989) for a general explanation of terms).

Pages 221–226 of that book (Time Series Analysis) provides an exhaustive treatment of parameter estimation using Auto Regressive, Auto Progressive Moving Average, and other models for the input signal.

An alternative to the identification of the AR parameters $a_i$ of the pure AR model of $$y_k \left[ y_k = \sum_{i=1}^{n} a_i y_{k-i} + \mu_k, \right.$$

$k=0, 1, 2, \ldots, \mu_k$ being a white noise residual that is second moment ergodic (SMB), and $a_i$ being AR parameters, k being a discrete time] can be the identification of their equivalent MA parameters or their ARMA parameters [e.g. Graupe book on—Time Series Analysis, Chap. 2, 8, 9, 12] or the identification of a spectral model based on applying a Fourier Transform (FT) to $Y_k$ to yield y(jw) or y(f) where, $j=\sqrt{-1}$, w=angular frequency and $$f = \frac{\omega}{2\pi} =$$

frequency in Hertz. There is a 1:1 correspondence between the AR model and he FT model above (see Graupe, Ch. 1). However, identification of the FT model can be implemented easily, using Fast Fourier Transformers (FFTs) or using a filter bank of an array of band-pass filters [see U.S. Pat. No. 4,185,169 to Graupe et al.].

Here the power in each frequency band $\Delta f$ is $\Delta F[f_{max}, n]$ where $f_{max}$=maximum frequency range of interest for the information signal considered, say 8 KHz for speech n=number of bands.

Where $f(\cdot)$=a function of $(\cdot)$, $F(\cdot)$ above can be either a linear function such that $$F(f_{max}, n) = \frac{f_{max}}{n} \text{ or } F(f_{max}, n) \quad (1)$$

can be any nonlinear division of the spectrum, such as a logarithmic division into octaves, etc., to yield that $\Delta f$ change in width along the spectrum.

Once the power of y, denoted as $Y(f_i)$, is evaluated in the $i^{th}$ frequency band over a time sub-interval of duration T (approximately 10–15 msec in case of speech), to cover the duration of a typical short unvoiced speech phoneme, namely, a consonant, then $Y(f_i)$ is stored for M such intervals, say M=25 to cover a total duration of about 300 msec, which is well above the duration of even the longest speech phonemes (these being voiced phonemes, namely vowels, no longer than 120 msec).

Subsequently, the minimum of $Y(f_i)$ over each interval of M sub-intervals as above, is considered to be the power of noise in this interval (of M sub-intervals), noting the non-stationarity of speech relative to the noise considered. The noise considered, namely environmental noise, changes its parameters (including its frequency power spectrum above) more slowly than speech whose spectrum drastically changes at least every 120 msec in the case of voiced phonemes). This, therefore, constitutes the identification of the spectral time series parameters $Y(f_i)$ of $y_k$ in the frequency domain and the retrieval of the spectral parameters $N(f_i)$ of the noise $n_k$, with (2) $N(f_i)=\min[y(f_i)]_{MT}$ denotes minimum value over an interval of M sub-intervals of duration T.

Another alternative identification of $y_k$, $n_k$ can be in terms of wavelet transform (WT) parameters of $y_k$ and of $n_k$, using a wavelet transform as in the Mallat paper disclosed hereinafter, where the wavelet parameters yield spectrum-like distribution measures of $y_k$ or of $n_k$ in the WT domain. This gives another equivalent parameter representation of $y_k$ and of $n_k$ above.

The following references, incorporated herein by reference, provide additional teachings on BAF, power spectrum of white noise and spectrum (the spectrum of the spectrum), wavelet transforms, active noise cancellation (ANC), and liftering: U.S. Pat. No. 4,025,721 to Graupe et al.; U.S. Pat. No. 4,185,168 to Graupe et al.; U.S. Pat. No. 5,097,510 to Graupe et al.; and Mallat, S. G., *A Theory for Multiresolution Signal D-composition-Wavelet Representation*, IEEE Transactions of Pattern Analysis & Machine Intelligence, Vol. II(1989).

A prior art method of filtering a signal is illustrated in the paper by Etter, Moschytz, and Graupe, *Adaptive Noise Reduction Using Discriminating Cost Functions*, Proceedings of the IEEE-CASSP conference, Toronto 1991. The filtering discussed in this paper minimizes a discrimination function.

There is a resulting need to be able to filter a noisy input signal, in real-time, in which there is no prior time-domain information or frequency-domain parameter information.

SUMMARY OF THE INVENTION

The present invention encompasses a blind adaptive filter that filters an input signal comprising a noise signal and an information signal. The information signal and noise signal are both inaccessible and have apriori unknown parameters. An identifier stage separates the noise parameters from input signal parameters. An open loop filter stage generates a first filtered signal from the noise parameters and the input signal parameters.

A first cost function generator generates a first cost function signal and an inverse first cost function signal that serves to maximize the nonstationarity rate of the information signal. A residual signal generator generates a residual signal from the difference between the input signal and the first filtered signal, and a minimization sub-system minimizes the first cost function.

A second cost function generator generates a second cost function signal and an inverse second cost function signal that serves to maximize a stationarity feature of the residual signal. A combiner generates a combined cost function signals from the inverse first cost function and the inverse second cost function. A quasi-closed loop filter stage generates the filtered output signal from the noise and input signal parameters, to minimize the second cost function.

Furthermore, the second cost function unlike the identifier and the first cost function, considers data both from a post time interval and also from a future time interval of up to 30 milliseconds into the future of the discrete time instance for which an estimate $\hat{s}(k)$ of $s(k)$ is generated such that $\hat{s}(k)$ occurs a short time later than $s(k)$ and $y(k)$.

These and other aspects and attributes of the present invention will be discussed with reference to the following drawings and accompanying specification.

BRIEF DESCRIPTION OF THE DRAWINGS

FIGS. 15A–D illustrate various communication devices usage of the blind adaptive filter technology of the present invention.

DETAILED DESCRIPTION OF THE DRAWINGS

Figure 1:
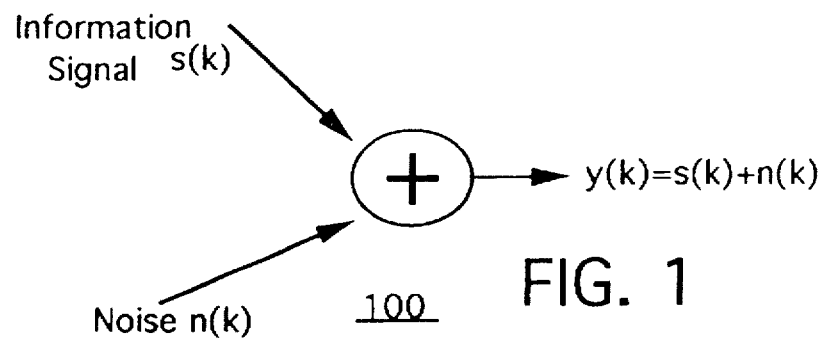
FIG. 1 shows a block diagram of the input signal source $(y_k)$ of the present invention, in terms of information signal $(s_k)$ and noise components $(n_k)$.

While this invention is susceptible of embodiment in many different forms, there is shown in the drawing, and will be described herein in detail, specific embodiments thereof with the understanding that the present disclosure is to be considered as an exemplification of the principles of the invention and is not intended to limit the invention to the specific embodiments illustrated.

The adaptive filtering process and apparatus of the present invention solve the problem of real-time filtering of a noisy signal. This filtering is accomplished without prior knowledge of the signal or noise parameters.

Illustrated in FIG. 1 is a block diagram of the generation of the input signal, $y(k)$, of the present invention. The information signal is designated $s(k)$ and the noise signal is designated $n(k)$. In the preferred embodiment, the information signal is speech. The accessible input signal to be filtered is $y(k)=s(k)+n(k)$, where k is discrete time.

In the preferred embodiment, the noisy input signal is sampled and converted to digital form by an analog to digital converter. Both the sampling and the digital to analog conversion are well known in the art. Alternate embodiments may operate on the analog form of the input signal.

The preferred embodiment uses 11 bit or greater A/D conversion. The sampling rate may range from 8 kHz for telephone to 50 kHz for high fidelity sound.

In the preferred embodiment, there is no prior information about s(k) or n(k) except for the fact that both coexist in the same frequency band nor is there separate access to either. The spectra of both signals are unknown even though they cover the same arbitrary spectrum. Only $y_k$ is accessible.

In contrast to speech, almost all environmental noise signals typically have a common property. The rate of change of their parameters is considerably less than the rate of change of the parameters of speech signals. The term stationary is used to designate an interval in a sampled signal in which the parameters stay within given limits.

For the purposes of this description, $t_{max}$ is the maximum length of a stationary period in the speech signal. Typically $t_{max}$ is about 120 msec which corresponds to the duration of long vowels, namely of long phonemes of voiced or speech. The noise is assumed to be a sequence of stationary periods, each period being longer than $t_{max}$.

Figure 11:
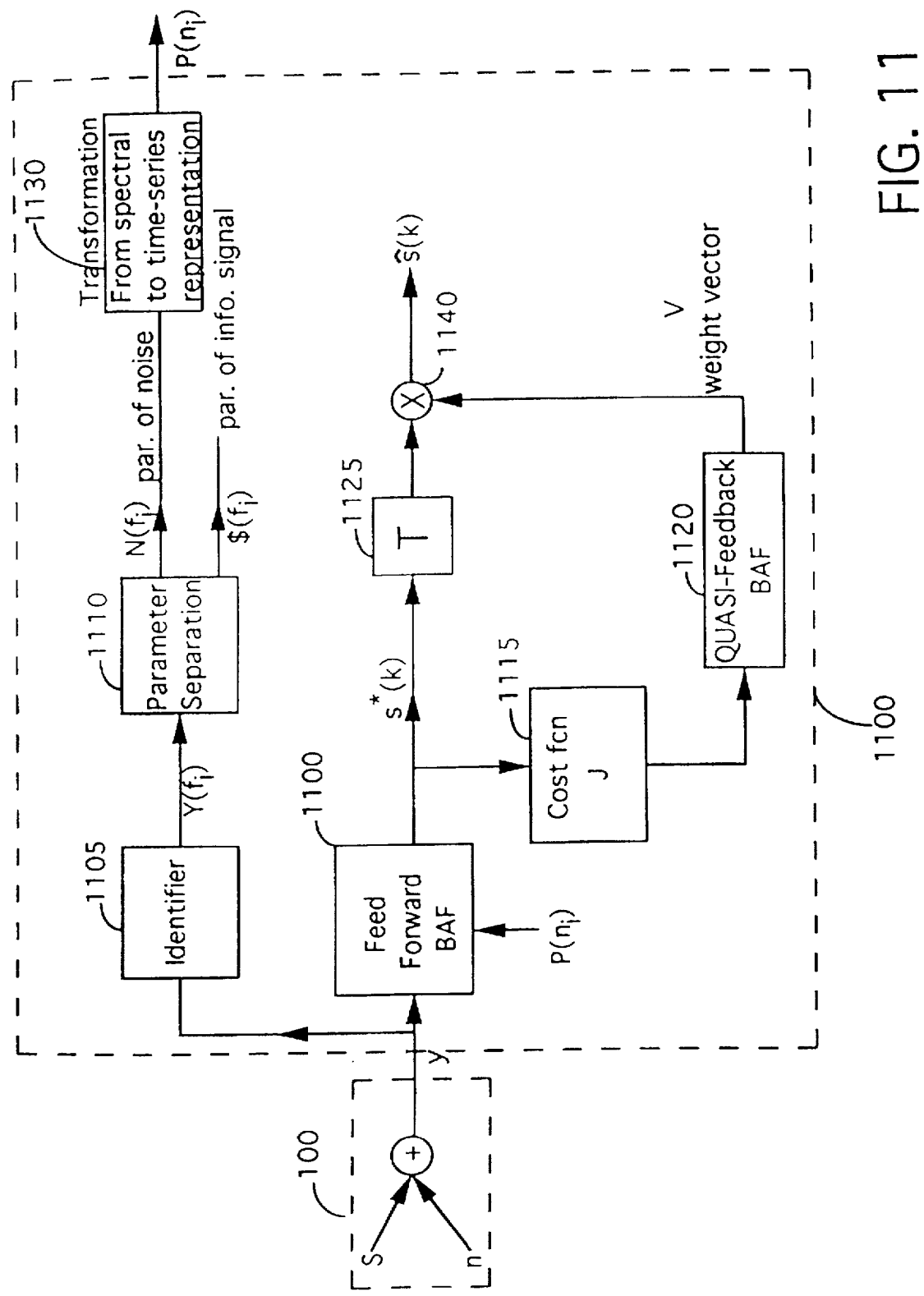
FIG. 11 shows a block diagram of the blind adaptive filter in accordance with the present invention.

A cost function J, a non-negative function to measure performance, is defined over a data frame of length N. The sample variances are calculated within such a frame over L samples. These subframes of length L do not overlap, therefore $p=N/L$ variance values result from one frame. The sample variance s(i) of the filtered data is:

$$\sigma(i) \sqrt{\frac{1}{L} \sum_{k=0}^{L-1} \hat{s}^2(iL-k)} \quad ; i=1,2,\ldots p \quad (3)$$

where $\hat{s}(i)$ is the filtered signal ($\hat{s}(i)$ is the output of a filter as in the present design at time i as illustrated in FIG. 11). This is calculated from the input vector $y=|y(0)\ y(1)\ \ldots\ y(N-1)|'$ and the parameter vector p(n) as illustration FIG. 9.

Figure 9:
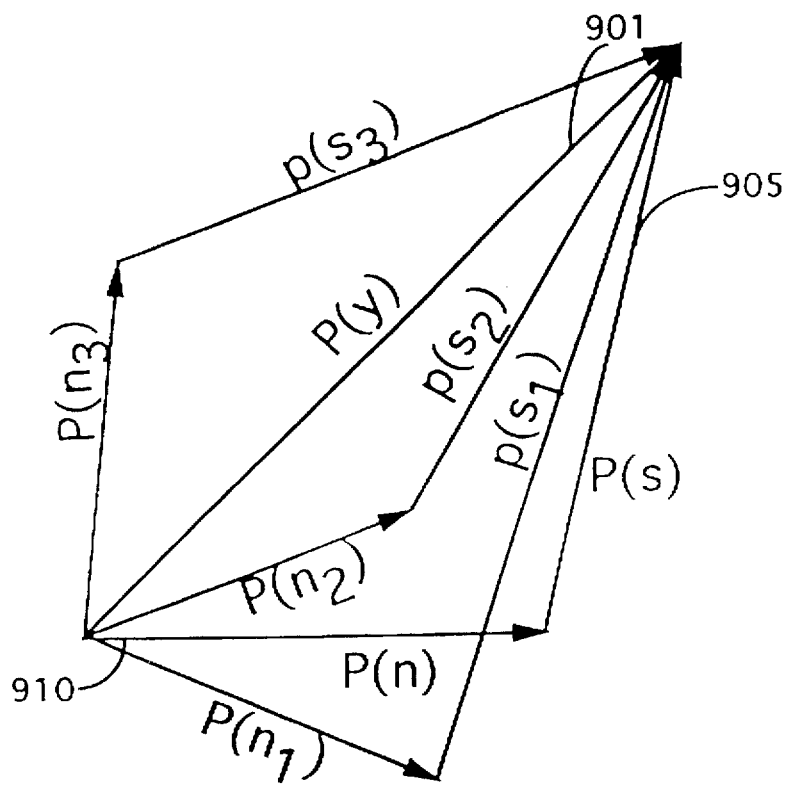
FIG. 9 shows a general vector space representation of $P(y)$, $P(n)$, and $P(s)$ in accordance with the present invention.

Referring to FIG. 9, a general vector space representation of P(y)(901), P(n)(910), and P(s)(905) is shown. P(y)(901) is the parameter vector of y that is identified by measurement data such as from least squares identifiers, or by FFt. This power is over a duration T of any sub-interval.

P(n)910 is the parameter vector of the noise as separated by feature information such that it minimizes the cost function considered. P(s)(905) is derived using P(y) and P(n) as above. Also used in deriving to the parameters are $p(n_1), p(n_2)$, etc. and $p(s_1), p(s_2)$ etc., which correspond to an infinite number of combinations that add up to the measured p(y) but which do not minimize the cost considered and hence do not satisfy the assumptions of stationarity that are employed.

Figure 10:
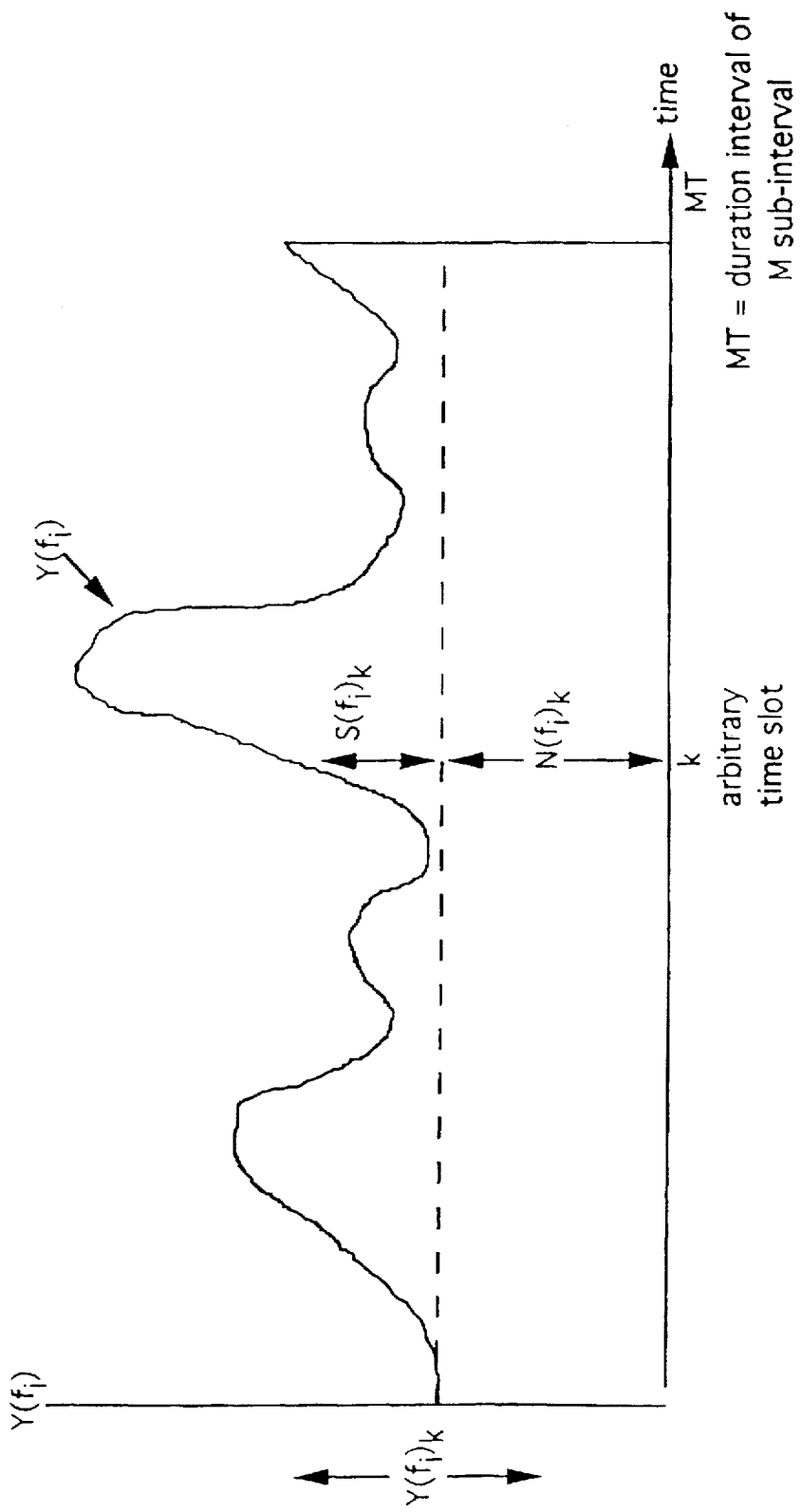
FIG. 10 shows a power spectrum of the input signal illustrating the contribution, of the information signal and of the noise in that power spectrum, in accordance with the vector space representation of FIG. 9.

FIG. 10 shows the power spectrum of $Y(f_i)$, for which the parameter vectors combination P(s), P(n) of FIG. 9 were derived. This signal is for frequency band i over a duration MT. $N(f_i)$ is the offset from zero of the signal. This term is constant over the interval MT. $\$(f_i)$ is the amplitude of the power spectrum from $N(f_i)$. $\$(f_i)$ changes over the interval as the changes occur in different speech phonemes over the interval change. Namely, the energy of speech in the given frequency band changes as the phonemes change.

FIG. 11 shows a block diagram of the blind adaptive filter of the present invention. The input signal generator of FIG. 1 inputs the signal y into both a feed forward blind adaptive filter (1100) and identifier block (1105). The identifier block (1105) identifies the parameters of the input signal and generates the signal's power spectrum $Y(f_i)$. This signal is input to a parameter separator block (1110) that generates the parameters of noise $N(f_i)$ and the parameters of the information signal's power spectrum $\$(f_i)$. The parameters of the noise are input to a transformation block (1130) which then transform the parameters into the signal parameters $P(n_i)$. The transformation block (1130) can be any transformation from one domain to another such as the Laplace and Fourier transforms or time series or AR/ARMA domain. For examples of other transforms, see the Graupe reference, chapter 1, pages 6–7.

Figure 7:
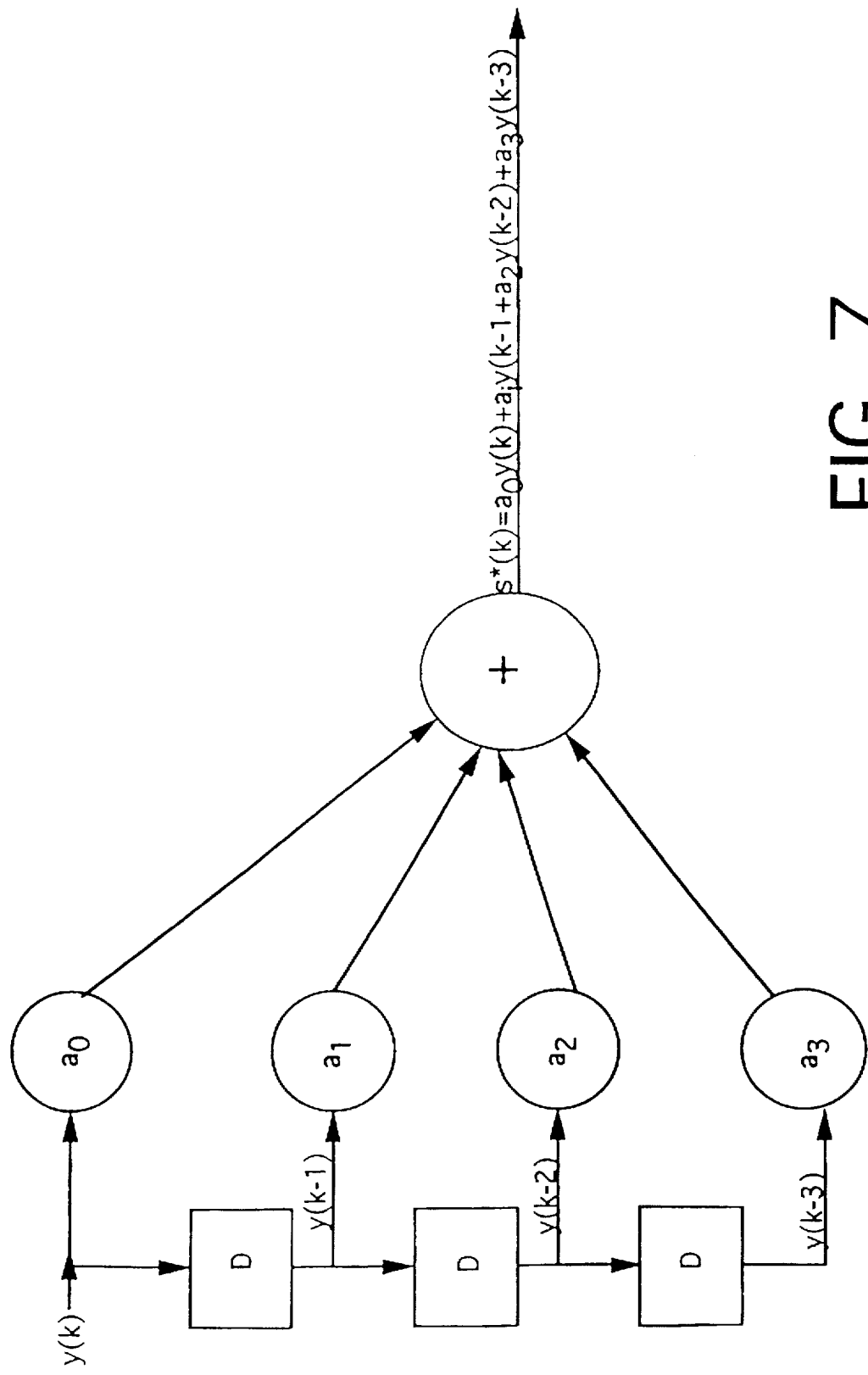
FIG. 7 shows a block diagram of an open-loop filter array (time domain), with $S^*(k)$ being the filtered estimate of $s(k)$ after the open loop stage only.

This noise parameter vector $p(n_i)$ is input to the feed forward blind adaptive filter (1100) to fine tune the filter. $P(n_i)$ is any formulation of parameters of $n_k$. The feed forward blind adaptive filter (1100) generates a first (partially) filtered output signal denoted s*(k) as illustrated in FIG. 7. The signal s*(k) satisfies $$s^*(k) = a_0 y(k) + a_1 y(k-1) + a_2 y(k-2) + \ldots = \sum_{i=0}^{M-1} a_i y(k-i) \quad (4)$$

where $a_i$ is the parameters of the open loop filters of FIG. 7. These parameters are calculated as the Wiener filter parameters (see Graupe, chap. 11, pages 198–199).

Figure 12:
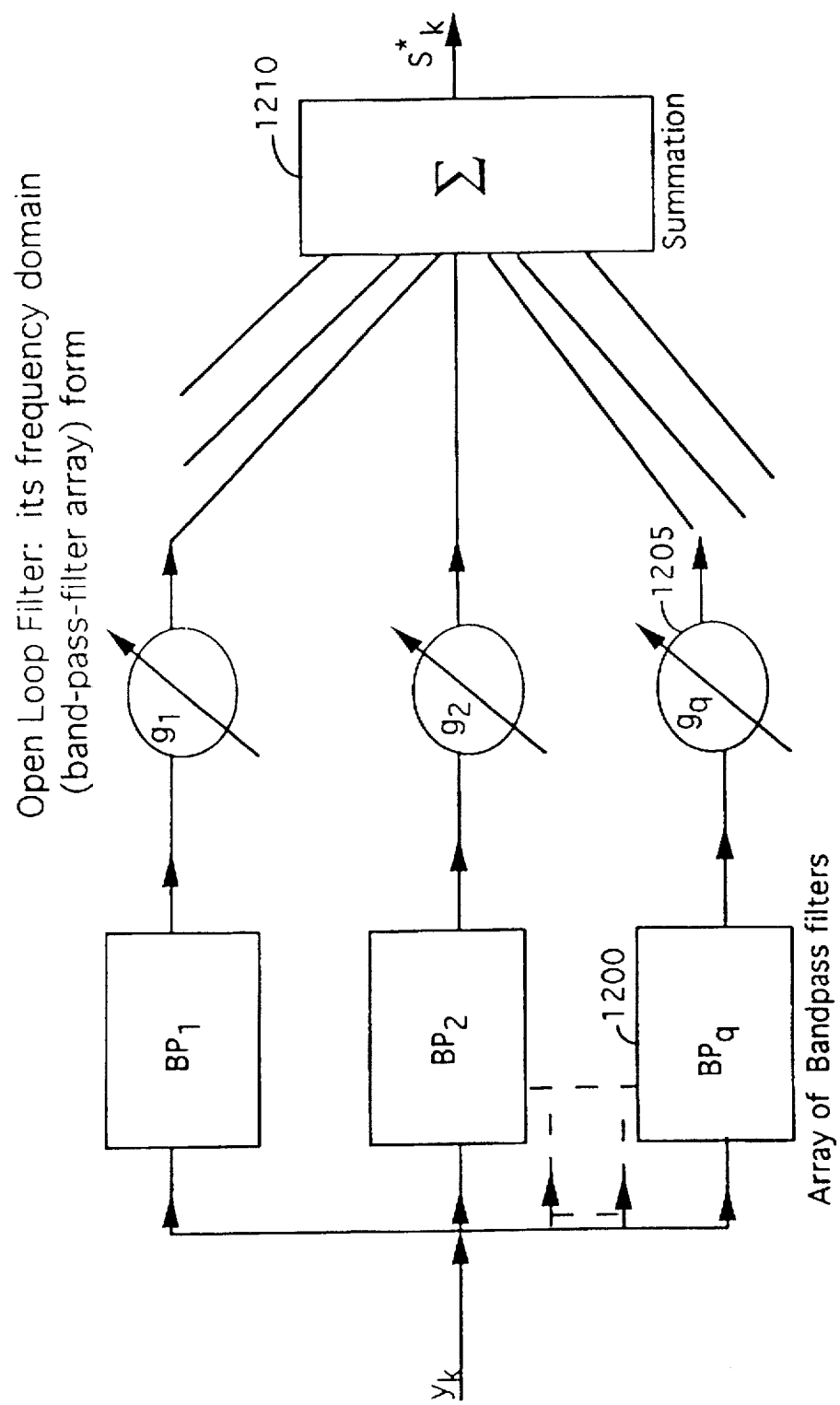
FIG. 12 shows a block diagram of an open-loop frequency domain filter corresponding to the time domain filter of FIG. 7.

Alternatively, as illustrated in FIG. 12, s*(k), is derived such that it is the output of a filter array (1100), on q bandpass filters whose gains, $g_i$ (1205), satisfy:

$$g_i = \begin{cases} = 1 \text{ if } N(f_i) < N(f_j) \text{ for every } j \neq i \\ = \frac{K}{N(f_i)} \text{ otherwise}, 0 < \frac{K}{K_{f_i}} < 1 \end{cases} \quad (5)$$

Hence, the channel (band) with no noise or exhibiting the lowest noise has a power gain of 1. Otherwise, the higher the noise power, the lower is the gain of that band.

FIG. 12 illustrates a block diagram of a system operated in accordance with equation (4). The non-stationarity part of y(k) is assumed to be s(k). The relatively stationary portion of y(k) is n(k). The process and apparatus of the present invention, in its open loop configuration, leads to tune a Wiener Filter of a bandpass filter array (1200) that approximates a Wiener Filter in the discrete frequency domain. Yet in obtaining the output of this open loop, it is not determined in the prior art whether the open loop design has achieved the best possible separation of noise from speech, noting that it cannot look back at itself to see if indeed the outcome $\hat{s}(k)$ which is based on identifying $N(f_i)$ or $p(n_i)$ over data taken during an interval that stretches MT seconds (about 300 msec) prior to time k is still relevant. In fact, $\hat{s}(k)$, is still only based on old noise parameters, never examining $\hat{s}(k)$ itself. This is overcome in our invention by the innovative aspect of closing the loop on $\hat{s}(k)$.

Figure 13:
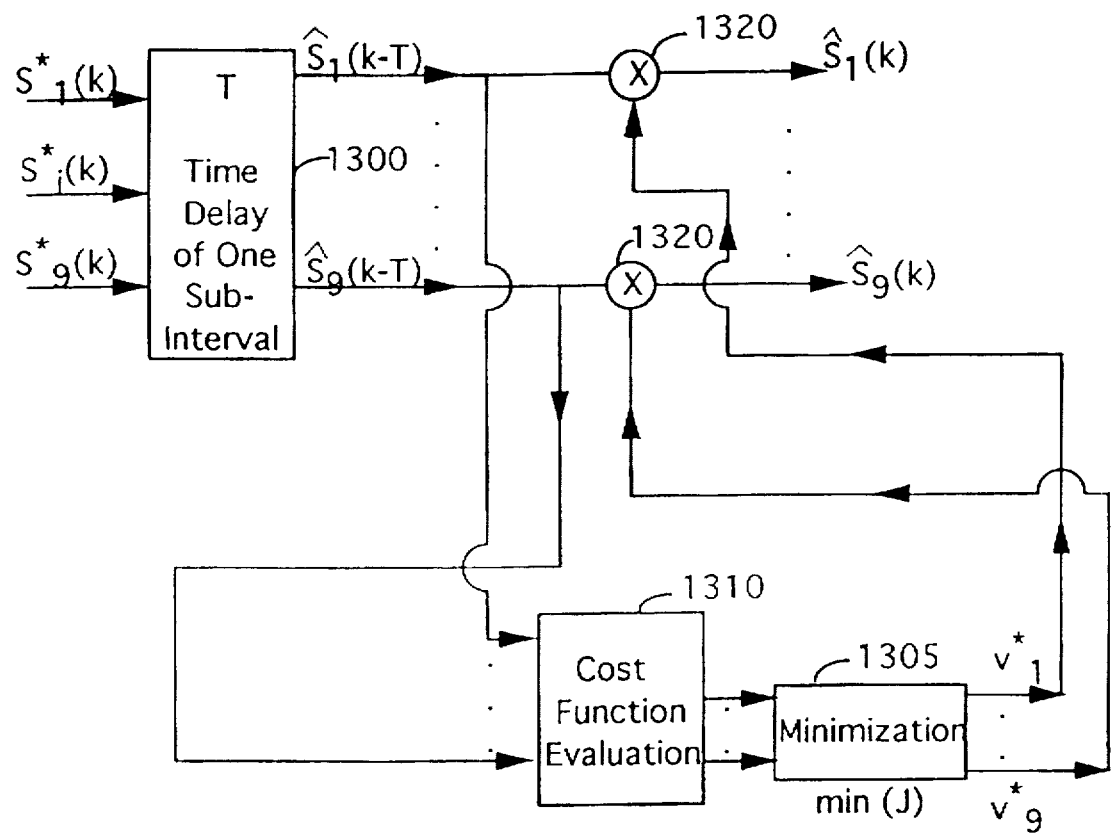
FIG. 13 shows a block diagram of the closed loop part of the filter in accordance with the present invention.
Figure 14:
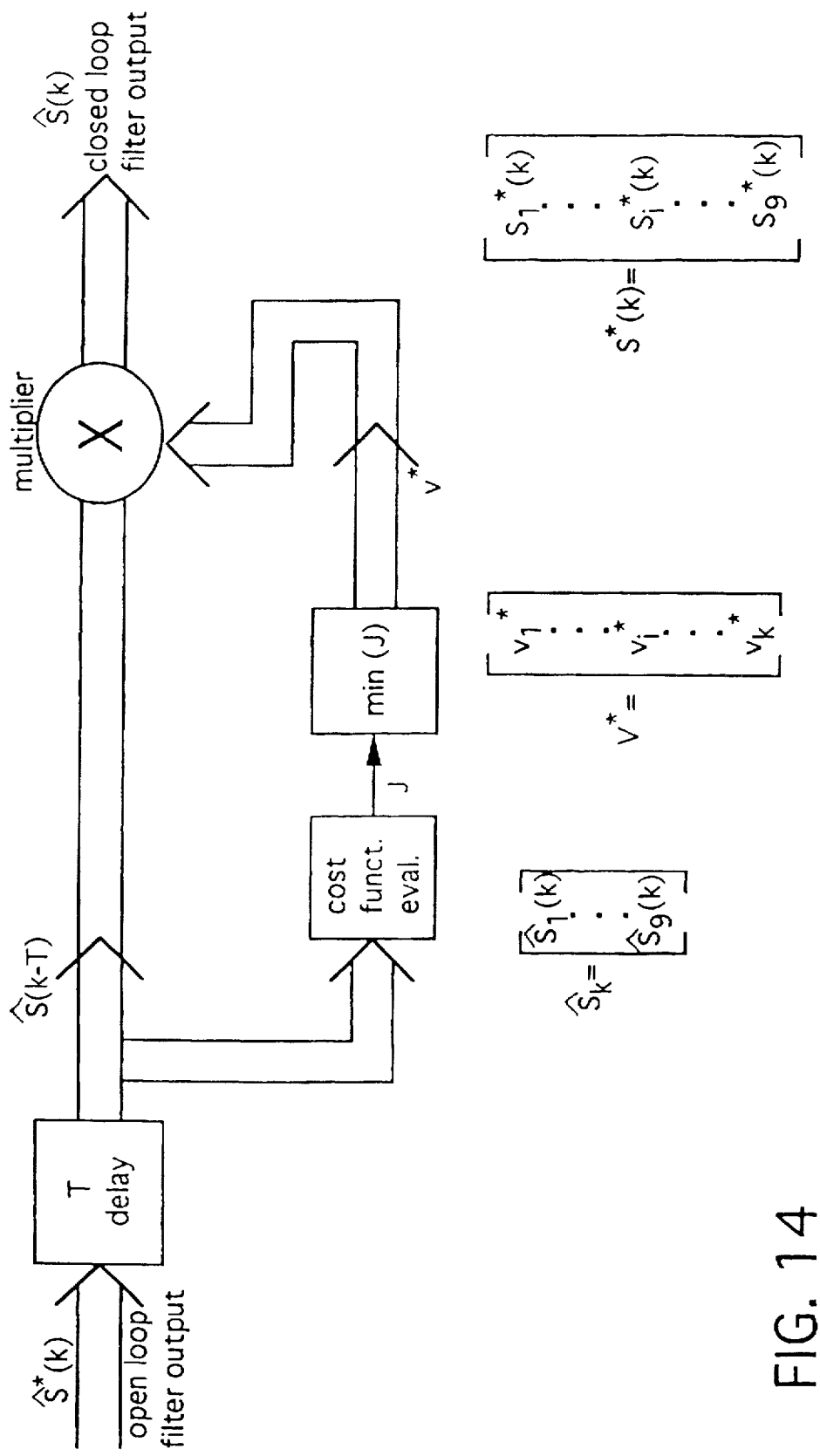
FIG. 14 is a vector notation form of FIG. 13.

The closing of the loop on $\hat{s}(k)$ can, however, result in oscillations, and instability since the cost function to be used does not guarantee stability in the general case. To overcome this difficulty, $\hat{s}(k)$ is used in a quasi-closed loop manner only, as illustrated in FIG. 13. Measurements of $\hat{s}(k)$ are processed over an interval of T(msec.) (1300), i.e. of one sub-interval, to minimize (1305) a cost function (1310) as shown below to yield s*(k). We then multiply $\hat{s}(k)$ of that quasi-closed loop minimization with $\hat{s}(k-t)$ to get s*(k) over this sub-interval and repeat this procedure for each subsequent sub-interval. FIG. 14 illustrates the same quasi-closed loop structure of FIG. 13, but in a vector format.

The quasi-feedback design first formulates a cost function J to be minimized such that its minimum will jointly satisfy that the feedback output s*(k) will maximize the non-stationarity of s*(k). This makes its features best resemble the speech features and maximizes the stationarity of the filter's new residual y(k)-s*(k). This best resembles the features of environmental noise that was assumed to be stationary over the interval MT above. |y(k)-s*(k)| is the part of y(k) that is being removed by the filtering process above.

$\hat{s}(k)$ is generated by the quasi-closed loop structure of FIG. 11. s*(k) is delayed (1125) by T and is also input to the cost function J (1115). The cost function is minimized in the quasi-feedback BAF (1120). The resulting weight vector, v, is multiplied (1140) with the delayed s*(k) to generate ŝ(k).

For defining the cost function (such as for FIGS. 5, 11, and 13) we denote the absolute value of the relative change of the variance as:

$$\Delta V_{(i)}(j) = \left| \frac{\sigma(j) - \sigma(j-1)}{\sigma(j-1)} \right| ; j = 1, 2, \ldots, p \quad (6)$$

j denoting a discrete time indicator.

An exponential weighting factor, $w(i) = t^i$ for $0 < t \leq 1$, may be introduced to emphasize the more recent changes in the signal.

An error for a sub-frame i is defined such that it increases whenever a stationary period extends beyond $t_{max}$. This error feature considers the duration between a down-going and an up-going threshold crossing. The error is defined as:

(7) $e(j) = \tau - \tau_{max}$; if $\tau_{max} \wedge \Delta V(i) < \Delta V_\tau$ otherwise, (8) $e(j) = 0$; $j = 1, 2, \ldots, p$;

where t is the time that has elapsed since the last down going threshold-crossing of $\Delta V(i)$.

The power of the input signal, y(k), is determined by taking the integral of the signal squared over a period from 0 to T. The signal is at some frequency band $f_i$:

$$P[y(f_i)] = \int_0^T y^2 dt \quad (9)$$

Figure 2:
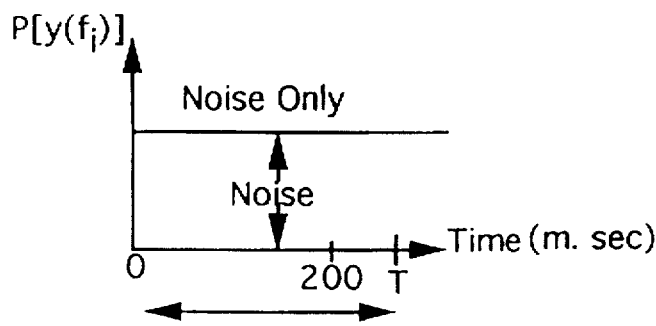
FIG. 2 shows a typical plot of the power of an input signal, $y(f_i)$, versus time, where $y(f_i)$ is noise only, in an i'th frequency interval, and over a time interval T of say 300 milliseconds (namely, above $T_{MAX}$ of 120 milliseconds, where noise may be assumed to be stationary in that frequency interval.

FIG. 2 illustrates a plot of $P|y(f_i)|$ versus time, where $P|y(f_i)|$ is the power of a signal containing noise only. It can be seen that this is a constant amplitude signal since the average power of the noise is constant with respect to time.

Figure 3:
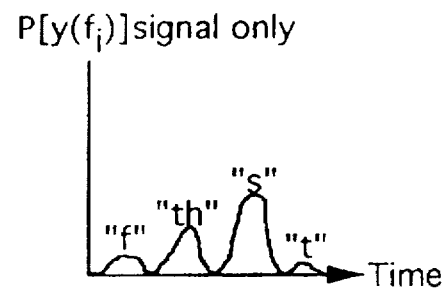
FIG. 3 shows a typical plot of the power of an input signal, $y(f_i)$, versus time, where $y(f_i)$ is an information signal only, in an i'th frequency interval, over the same time interval as in FIG. 2, noting the non-stationarity over that interval, "s", "th", "f", etc. denoting speech phonemes of the respective sounds of $y_k$, $s_k$, $h_k$.

FIG. 3 illustrates a plot of $P[y(f_i)]$ versus time, where $P|y(f_i)|$ is (for a given frequency band) the power of a signal containing information only. In a preferred embodiment, the information signal is speech and each curve on the graph of FIG. 3 illustrates a different letter of the alphabet. This plot shows that each letter requires a different amount of power.

As an example, the first curve is an "f" sound, the second curve is a "the" sound, and the third curve is an "s" sound. Therefore, if all of these sounds are put together into a speech signal, they will form a sequence of varying power in each frequency band.

Figure 4:
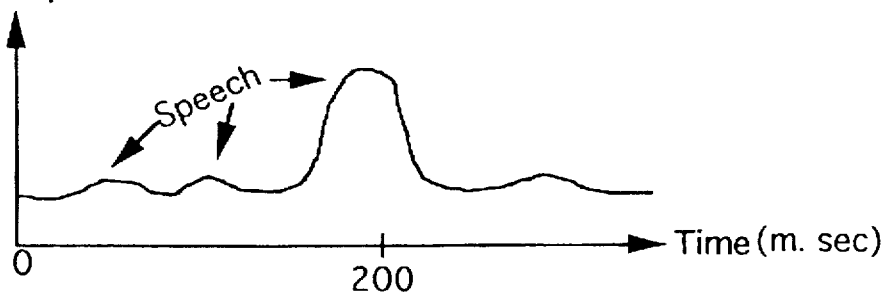
FIG. 4 shows a plot of the power of an input signal, $y(f_i)$, versus time, where $y(f_i)$ is a combination of the noise and the information signal, in an i'th frequency interval and over the same time interval as in FIG. 2.

FIG. 4 shows a plot of $P[y(f_i)]$ versus time in band i, where $y(f_i)$ includes both the noise signal, n(k), of FIG. 2 and the speech signal, s(k), of FIG. 3. This graph illustrates that the varying power of s(k) has an offset equal to the power of n(k). An object of the invention and a feature of the apparatus and process of the present invention is to maximize the s(k) portion while removing the n(k) portion.

Figure 5:
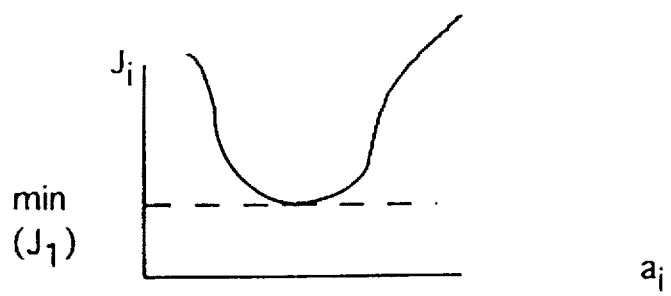
FIG. 5 shows a plot of a cost function, $J_1$, versus a filter coefficient, $a_i$.

A typical plot of cost function $J_1$ versus filter coefficient $a_i$ is illustrated in FIG. 5. The minimum of $J_1$ is found at the point on the curve where the derivative is 0, for all i, and the second derivative is greater than 0.

Figure 6A:
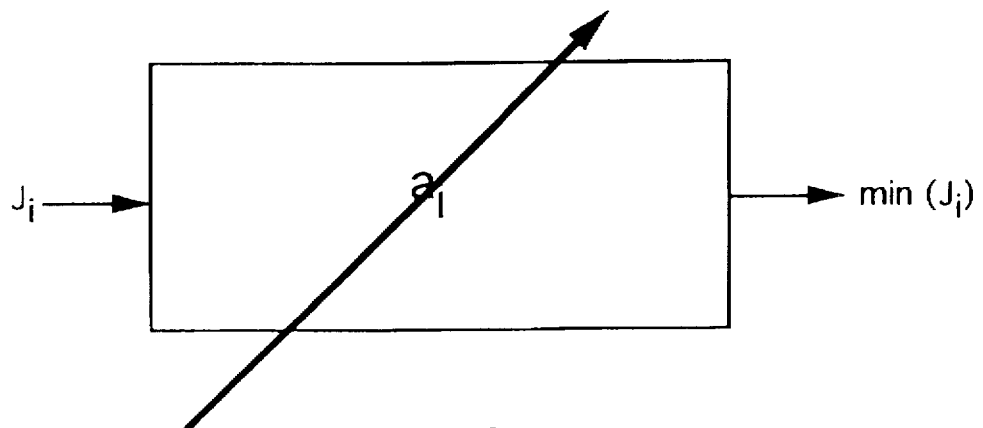
FIG. 6 shows the tuning of a filter coefficient $a_i$ to minimize cost $J_1$.
Figure 6B:
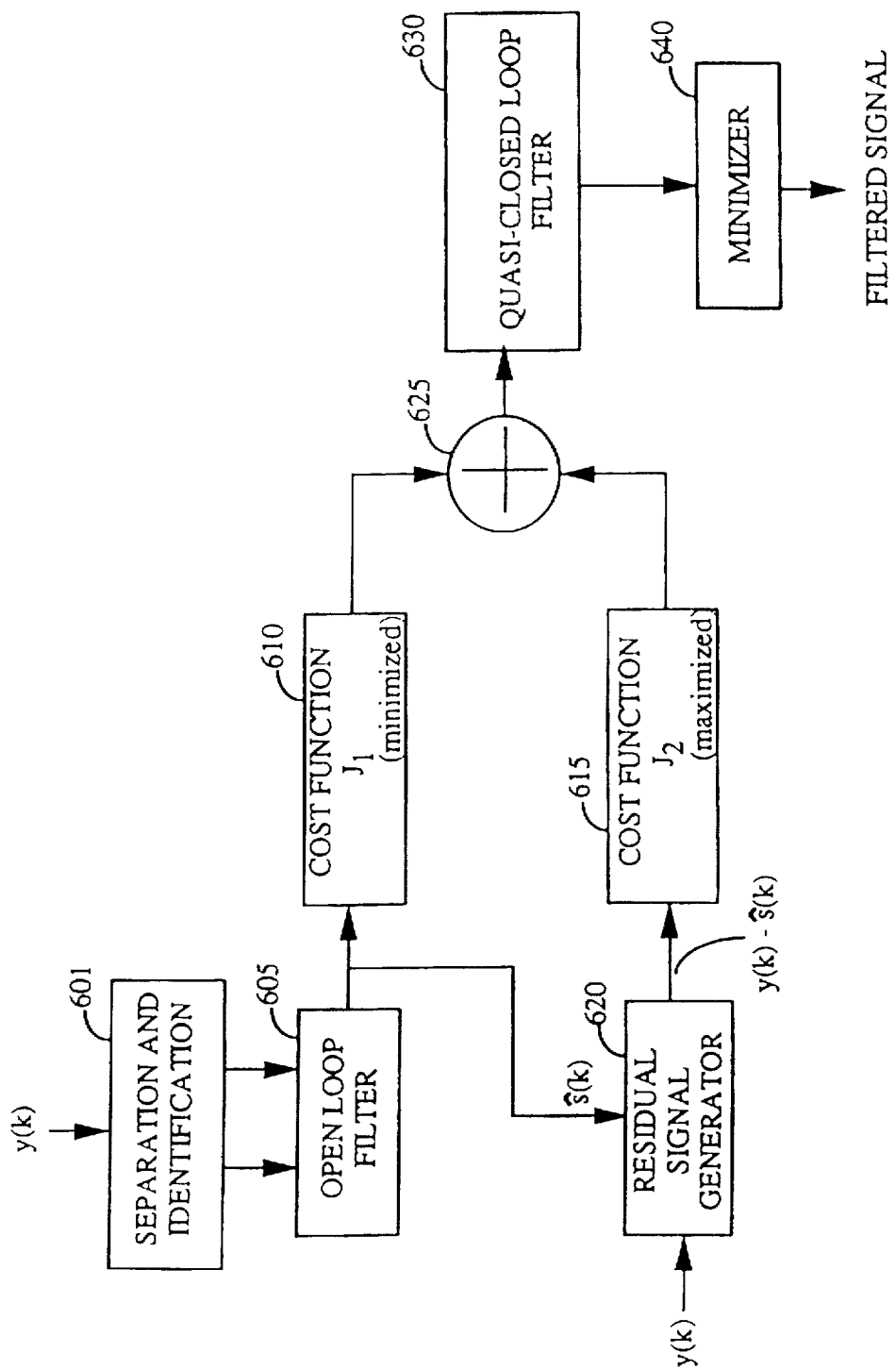

The apparatus and process of the present invention operates by minimizing the cost function $J_1$ as illustrated in FIGS. 6A–B, while maximizing another cost function, subsequently designated $J_2$. Minimizing $J_1$ implies the degree of non-stationarity of the speech signal is maximized.

The cost functions $J_1$, $J_2$, and $J_3$ are defined by:

$$J_{1_i} = C_1 \left[ \sum_{k=0}^{P-1} w(k) \Delta V(p-k) \right]^{-1} + C_2 \left[ \sum_{k=0}^{P-1} w(k) e^2(p-k) \right]; \quad (10)$$

-continued $$J_{2_i} = C_3 \left[ \sum_{k=0}^{P-1} w^*(k) \Delta V^*(p-k) \right] + \quad (11)$$

$$C_4 \left[ \sum_{k=0}^{P-1} w^*(k) e^{*2}(p-k) \right]^{-1} ; \text{ and}$$

$$J_3 = \sum_i (J_{1_i} + J_{2_i}) \quad (12)$$

where p, w(k), $\Delta V(p-k)$, e(p-k) are described above; $C_1$, $C_2$, $C_3$, $C_4$ are weighing coefficients; and the * indicates that w*(k), $\Delta V^*$, e*(k) all relate to [y(k)−ŝ(k)], and not to ŝ(k).

The weighing coefficients $C_i$, can be changed for different applications. In the preferred embodiment of communications, they are all 1. In other embodiments, such as extracting an electrocardiogram signal from noise, they may be different values. The weighing coefficients are typically found by experimentation. They are being set experimentally for long sequences of speech. They are speaker and noise independent and are set experimentally to yield best results over long speech sequences of 10,000–20,000 samples.

It can be shown experimentally that simply minimizing $J_1$ yields results where the minimization may get stuck in a wrong minimum and/or the minimization does not give the correct power (gain factor) of the signal. Both situations render the filter ineffective or not practical in many signal-in-noise cases.

Figure 8:
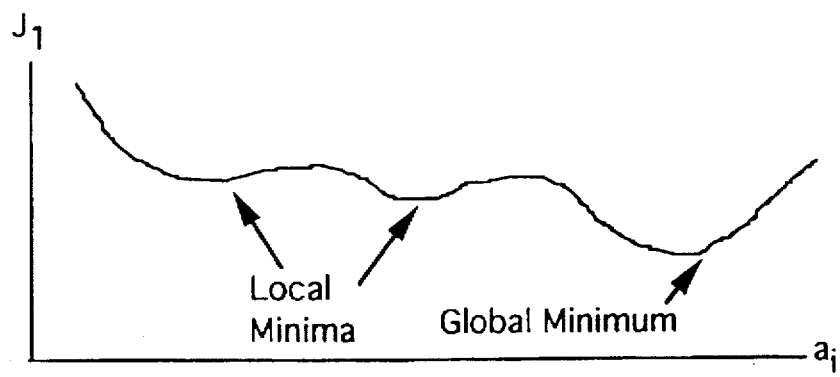
FIG. 8 shows a plot of $J_1$ versus $a_i$ having multiple local minimums and a global minimum in accordance with the present invention.

An example where $J_1$ can get stuck in the wrong minimum is illustrated in FIG. 8.

If $J_1$ is represented by the function illustrated in FIG. 8, having multiple valleys, the minimization may get stuck on the local minimum (801) instead of the global minimum (805).

To overcome the shortcomings of the prior art, the process and apparatus of the present invention jointly minimizes $J_1$ and maximizes $J_2$ for each frequency band. $J_1$ employs $\Delta V(j)$ and e(j) relating to above, and hence relating to, the filtered (estimated) signal or image. Furthermore, $J_1$ and $J_2$ are computed per each frequency band, and a delay of T msec. is utilized between ŝ(k) and s*(k) to guarantee filter stability.

The cost function $J_2$ has the same form as $J_1$, but ŝ(k) is now replaced by [y(k)−ŝ(k)]. This is the difference between the input signal and noise and the estimated signal. This residual is an estimate of the noise in y(k). The stationarity of the residual must also be maximized.

J, the overall cost function to be minimized, allows the replacing of the maximization of a cost of the form of $J_1$ but related to |y(k) −ŝ(k)|, by a minimization of its inverse form J not only maximizes the non-stationary features in ŝ(k) that may get stuck at sub components of $y_k$, it also maximizes the relative stationarity of the noise component in the same y(k). This is due to the fact that, in the blind adaptive filtering of the present invention, not only is the signal part of the data relatively non-stationary but, at the same time, the noise in the data is relatively non-stationary.

In an alternate embodiment of the present invention, J is not used for the whole data, but only to band-passed channels of y(k). In this case, y(k) is first channeled into N spectral channels and, subsequently, the minimization of $J_3$ is applied to each of these channels. In another embodiment, the minimization of J is applied to only those channels with least power. Finally, weights of the quasi-closed loop filter are determined via $$\frac{\min}{v_1} J \to v_i^*$$

$$s^*(k) = \Sigma \, v_i^* \, \hat{s}_i(k) \quad (13)$$

where $\hat{s}(k)$ are $\hat{s}(k)$ at output of each band of the open loop. This is illustrated in FIG. 11.

When y(k) is divided into N channels, the minimal power in each channel over a fixed time interval will allow direct determination of the gain of s*(k) in y(k). The power of y(k) is always available since y(k) is the data itself. In this embodiment, the fixed time interval, in the case of speech signals in noise, is 300 to 1000 msec.

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims.

The stabilization delay T that is employed in the closed loop is of 10–15 msec. in the preferred embodiment. This makes it non-audible in speech communication. Also, the open loop filter drives the filtered output close to its best optimal value noting that the minimization of J yields a multi-minima solution that may otherwise be poor (even if better than without filtering).

FIG. 6B illustrates a block diagram of one embodiment of the blind adaptive filter of the present invention. The input signal to be filtered, y(k) is input to the separation and identification block (601) that separates the noise parameters from the input signal parameters.

These parameters are input to an open loop filter (605) that generates the filtered signal $\hat{s}(k)$. A residual signal generator (620) subtracts the filtered signal from the input signal.

The filtered signal is input to the first cost function (610), $J_1$, as seen in eqn. 10 above. The residual signal is input to the second cost function (615), $J_2$, as seen in eqn. 11 above. As seen in eqn. 12, the output of the cost functions are added (625) and output to a quasi-closed loop filter (630), which responsive thereto outputs a filtered signal is then input to a minimizer (640) minimizes the cost function of eqn. 12.

FIG. 14 is a vector notation form of the closed loop filter circuit of FIG. 13.

While the preferred embodiment of the present invention is in the communications area, the Blind Adaptive Filter may be used in other applications. These additional applications can include telephones, hearing aids, helmets of personnel in noisy environments, data communications such as modems, and filtering of other signals that have a high rate of non-stationarity. Block diagrams of some communications devices are illustrated in FIG. 15.

FIGS. 15A–D illustrate communication devices utilizing blind adaptive filtering system of the present invention. FIG. 15A illustrates a speech signal in noise, $y_k$, coupled to an amplifier (1600) which provides an amplified output to a blind adaptive filter (1604) (such as the system illustrated in FIG. 11) providing a filtered signal output to a transmitting device (1607) which provides a modulated or encoded signal transmission output of a communication signal.

FIG. 15B illustrates a receiving sub-system for receiving the communications signal and processing it via a receiver circuit (1610) such as a radio receiver and decoder, a phone receiver, radar, etc. The receiver provides a noisy audio output from the receiver of $y_k$. This signal is coupled as an input to the blind adaptive filter (1614) (such as that illustrated in FIG. 11) to provide a filtered signal output coupled to a speaker (1617) and/or a processing sub-system (1616) for utilization of the received communication signal.

FIG. 15C illustrates a receiver system for receiving modulated data signals as the communications signal, and providing a receiver and demodulator (1620) to provide a noisy data output, $y_k$, coupled as input to a blind adaptive filter system (1624) (such as in FIG. 11), which provides a filtered signal output coupled as input to a modem (1627) for modulating and de-modulating the filtered signal for communication elsewhere.

FIG. 15D illustrates a television receiver sub-system for cleaning up and displaying a received modulated image communication signal, which is coupled to TV receiver system (1630) which de-modulates the received image signal and provides a noisy image signal $y_k$ coupled to the input of a blind adaptive filter system (1634) (such as in FIG. 11) which provides a filtered signal output to the TV monitor (1637) which provides a display of the filtered signal of the image. The noisy image signal $y_k$ is a single scan of an image of many scanned lines. Thus, this process is repetitive and ongoing during the display of a received signal. However, the application of the blind adaptive filter is not so limited.

Examples of devices that generate signals with high rates of non-stationarity relative to the noise include electromyographic signals, electrocardiographic signals, and electroencephalographic signals. A block diagram of medical devices which benefit from utilization of the present invention is illustrated in FIG. 16.

Figure 16A:
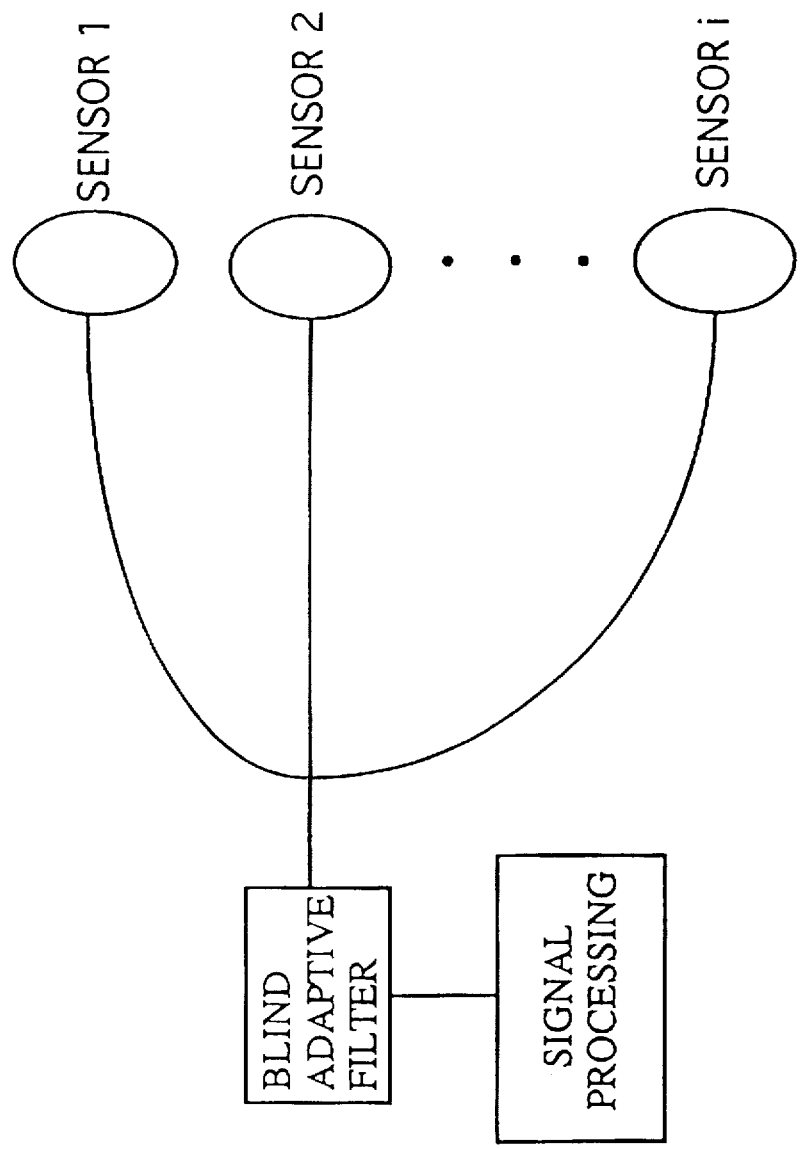
FIG. 16 illustrates individual medical devices which can utilize the blind adaptive filtering sub-system of the present invention, and also illustrates the capability for networked device usage.
Figure 16B:
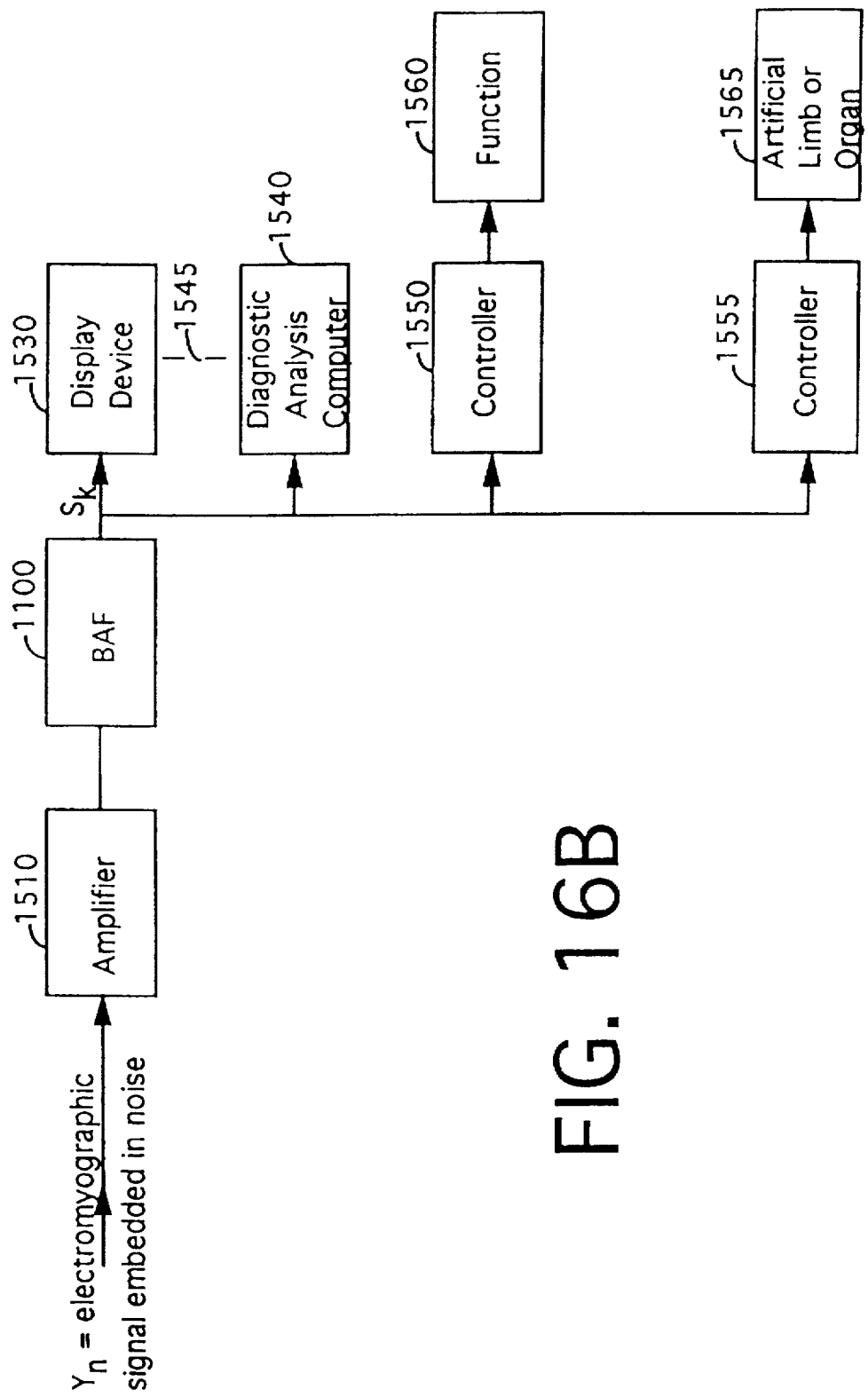

Referring to FIG. 16, medical devices utilization of the blind adaptive filter invention of the present invention is illustrated. An electrical signal, $y_n$, such as an electromyographic signal imbedded in noise is input to an amplifier (1510) which provides an amplified output signal as input to the blind adaptive filter (1100) in accordance with the present invention, which provides a filtered signal $\hat{s}_k$ which can be used by any one or more of a plurality of medical devices. In a stand alone usage, any one of a number of devices can be utilized with the output $\hat{s}_k$. In a network embodiment, two or more of a plurality of medical devices utilize the signal $\hat{s}_k$.

For example, a display device (1530) provides monitoring information to permit the viewer to monitor conditions. The display device (1530) can be a color CRT, and LCD, or threshold range indication device, as a few examples. The diagnostic analysis computer (1540) can be coupled to the signal $\hat{s}_k$ (1525) which permits the accumulation of statistical historical signal behavior for multiple uses including/ providing printing reports, displaying either locally or via a display interface (1525) to a display device such as (1530).

A controller (1550) coupled to the filtered signal $\hat{s}_k$ (1525), analyzes the filtered signal $\hat{s}_k$ in accordance with defined rule logic to control a functional electrical stimulator function module (1560) which is coupled to a patient. Uses of functional electrical stimulation and the rule logic for its use are well documented in the art.

Another type function module is an artificial limb or organ. Using the filtered signal (1525) $\hat{s}_k$, a controller (1555) can control an artificial limb or organ utilizing the filtered signal as direct control and/or feedback. The artificial limb or organ function modules (1565) are well documented in the art as is the rule logic to utilize them. Examples of functional electrical stimulation for purposes of providing mobility are taught in the present inventor's U.S. Pat. No. 5,097,510 and references cited therein.

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims.

What is claimed is:

1. A blind adaptive filter for generating a filtered output signal from an input signal comprising a noise signal and an information signal, the information signal and noise signal are both inaccessible and have apriori unknown parameters, the information signal parameters changing faster than the noise parameters, the filter comprising:
   a separation stage for identifying and separating the noise parameters from input signal parameters;
   an open loop filter stage, coupled to the separation stage and the input signal, for generating a first filtered signal in response to the noise parameters and the input signal parameters;
   a first cost function generator, coupled to the open loop filter stage, for generating a first cost function signal and an inverse first cost function signal that maximize a nonstationarity rate of the information signal;
   a residual signal generator, coupled to the input signal and the first filtered signal, for generating a residual signal in response to a difference between the input signal and the first filtered signal;
   a second cost function generator, coupled to the input signal and the residual signal generator, for generating a second cost function signal and an inverse second cost function that maximize a stationarity feature of the residual signal;
   a combiner for generating a combined cost function in response to the inverse first cost function and the inverse second cost function;
   a quasi-closed loop filter stage that employs a stabilization time delay, coupled to the open loop filter stage, for generating a second filtered output signal; and
   a minimization generator to generate a minimized second filtered output signal that minimizes the combined cost function.

2. The filter of claim 1 wherein the quasi-closed loop filter stage generates the filtered output signal by minimizing the combined cost function.

3. The filter of claim 1 wherein the information signal is a speech signal and the filter is used in a communications device.

4. The filter of claim 1 wherein the first filtered signal is a first approximation of the filtered output signal.

5. The filter of claim 1 wherein the first and second cost functions are generated for each frequency band of a plurality of frequency bands.

6. The filter of claim 1 wherein all filtering and parameters are wavelet transform filtering and wavelet transform parameters.

7. The filter of claim 1 and further including a plurality of weighting coefficient signals coupled to the first cost function generator and the second cost function generator.

8. The filter of claim 1 wherein the quasi-closed loop filter uses filter parameters generated by minimizing the combined cost function.

9. The filter of claim 1 wherein the open loop and quasi-closed loop filter stages operate in an array for a plurality of frequency bands.

10. A method for filtering an input signal using a blind adaptive filter, the input signal comprising a noise signal and an information signal where the information signal and noise signal are both inaccessible and have apriori unknown parameters, the information signal parameters changing faster than the noise parameters, the method comprising the steps of:
   separating the noise parameters from input signal parameters;
   generating a first filtered signal in response to the noise parameters and the input signal parameters;
   generating a first cost function signal for maximizing a nonstationarity rate of the information signal;
   generating a residual signal in response to a difference between the input signal and the first filtered signal;
   generating a second cost function signal for maximizing a stationarity feature of the residual signal;
   combining an inverse first cost function signal and an inverse second cost function signal to generate a combined cost function signal;
   minimizing the combined cost function signal to generate a set of filter parameters; and
   filtering the first filtered signal with a quasi-closed loop filter to generate a filtered output signal in response to the set of filter parameters.

11. A communications system comprising:
   a receiver for receiving an input signal comprising a noise signal and an information signal, each signal having apriori unknown parameters; and
   a blind adaptive filter for generating a filtered output signal from the input signal, the filter comprising:
      an identifier stage for separating the noise parameters from input signal parameters;
      an open loop filter stage, coupled to the identifier stage, for generating a first filtered signal in response to the noise parameters and the input signal parameters;
      a first cost function generator, coupled to the open loop filter stage, for generating a first cost function signal and an inverse first cost function signal that maximize a nonstationarity rate of the information signal;
      a residual signal generator, coupled to the input signal and the first filtered signal, for generating a residual signal in response to a difference between the input signal and the first filtered signal;
      a second cost function generator, coupled to the input signal and the residual signal generator, for generating a second cost function signal and an inverse second cost function that maximize a stationarity feature of the residual signal;
      a combiner for generating a combined cost function in response to the inverse first cost function and the inverse second cost function; and
      a quasi-closed loop filter stage, coupled to the open loop filter stage, for generating the filtered output signal.

12. The system as in claim 11 further comprising:
   a transmitter for broadccasting the filtered output signal.

13. A quasi-closed loop filter weight coefficient signal generator having an intermediate filtered input signal, the generator comprising:
   a time delay generator for delaying the intermediate filtered signal by a predetermined interval of time, thus generating a delayed signal;
   a cost function generator, coupled to the time delay generator, for generating a cost function signal from the delayed signal;
   a parameter minimizer, coupled to the cost function generator, for generating a minimized signal; and
   a multiplier, coupled to the parameter minimizer and the time delay generator, for generating the weight coefficient signal.

14. The weight coefficient signal generator of claim 13 and further including the weight coefficient generator generating a plurality of weight coefficient signals from a plurality of intermediate filtered input signals.

15. A medical apparatus comprising:
   a medical sensor input for generating an input signal comprising a noise signal and an information signal both having apriori unknown parameters;
   a blind adaptive filter for generating a filtered output signal from the input signal, the filter comprising:
      an identifier stage for separating the noise parameters from input signal parameters;
      an open loop filter stage, coupled to the identifier stage, for generating a first filtered signal in response to the noise parameters and the input signal parameters;
      a first cost function generator, coupled to the open loop filter stage, for generating a first cost function signal and an inverse first cost function signal that maximize a nonstationarity rate of the information signal;
      a residual signal generator, coupled to the input signal and the first filtered signal, for generating a residual signal in response to a difference between the input signal and the first filtered signal;
      a second cost function generator, coupled to the input signal and the residual signal generator, for generating a second cost function signal and an inverse second cost function that maximize a stationarity feature of the residual signal;
      a combiner for generating a combined cost function signal in response to the inverse first cost function signal and the inverse second cost function signal; and
      a quasi-closed loop filter stage, coupled to the open loop filter stage, for generating the filtered output signal responsive to the first filtered signal and the combined cost function signal.

16. A blind adaptive filter for generating a filtered output signal from an input signal comprising a noise signal and an information signal, wherein the information signal and noise signal are both inaccessible and have apriori unknown parameters, the information signal parameters changing faster than the noise parameters, the filter comprising:
   an identifier stage for generating the input signal's power spectrum and identifying input signal parameters;
   a parameter separation stage that separates the noise parameters from the input signal parameters;
   a transformation stage to transform the noise parameters into another domain, for generating transformed noise parameters;
   a first filter stage, coupled to the input signal and the transformation stage, for generating a filtered signal in response to the transformed noise parameters and the input signal parameters;
   a cost function generator, coupled to the first filter stage, for generating a cost function signal;
   a quasi-closed loop filter stage, coupled to the cost function generator, for minimizing the cost function and thus generating a weight vector;
   a delay stage, coupled to the first filter stage, for delaying the filtered signal by a predetermined time; and
   a combiner responsive to the delayed filtered signal and the weight vector to produce the filtered output signal.

17. A quasi-closed loop filter for filtering a plurality of input signals, the filter comprising:
   a time delay stage, having a predetermined time delay, coupled to the plurality of input signals and generating a plurality of delayed signals;
   a cost function stage, coupled to the time delay stage, for generating a plurality of cost function signals from the plurality of delayed signals;
   a minimization function stage, coupled to the cost function stage, for generating a plurality of minimized cost function signals; and
   a plurality of multipliers, each multiplier coupled to a different minimized cost function signal of the plurality of minimized cost function signals and a respective different delayed signal of the plurality of delayed signals, each multiplier producing a filtered signal.

18. The filter as in claim 17 further comprising means for combining the plurality of the filtered signals to generate a closed loop filter stage output.

19. A system for filtering an input signal using a blind adaptive filter, the input signal comprising a noise signal and an information signal where the information signal and noise signal are both inaccessible and have apriori unknown parameters, the information signal parameters changing faster than the noise parameters, the system comprising:
   means for separating the noise parameters from input signal parameters;
   means for generating a first filtered signal in response to the noise parameters and the input signal parameters;
   means for generating a first cost function signal and an inverse first cost function signal for maximizing a nonstationarity rate of the information signal;
   means for generating a residual signal in response to a difference between the input signal and the first filtered signal;
   means generating a second cost function signal and an inverse second cost function signal for maximizing a stationarity feature of the residual signal;
   means for combining the inverse first cost function signal and the inverse second cost function signal to generate a combined cost function signal;
   means for minimizing the combined cost function signal to generate a set of filter parameters; and
   means for filtering the first filtered signal with a quasi-closed loop filter to generate a filtered output signal in response to the set of filter parameters.

20. The system as in claim 19, wherein the input signal is a medical sensor signal, the system further comprising a medical device responsive to the filtered output signal.

21. The system as in claim 20 wherein the medical device is further comprised of a plurality of medical devices, each medical device independently responding to the filtered output signal.

* * * * *